(12) United States Patent
Nasli-Bakir et al.

(10) Patent No.: US 6,645,332 B1
(45) Date of Patent: Nov. 11, 2003

(54) METHOD FOR APPLICATION OF AN EXPANDABLE GLUING SYSTEM

(75) Inventors: Benyahia Nasli-Bakir, Saltsjö-Boo (SE); Stefan Lindberg, Vallentuna (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/700,872

(22) PCT Filed: Jun. 16, 1999

(86) PCT No.: PCT/SE99/01085

§ 371 (c)(1),
(2), (4) Date: Nov. 20, 2000

(87) PCT Pub. No.: WO99/67341

PCT Pub. Date: Dec. 29, 1999

Related U.S. Application Data

(60) Provisional application No. 60/091,442, filed on Jul. 1, 1998, provisional application No. 60/091,440, filed on Jul. 1, 1998, and provisional application No. 60/091,438, filed on Jul. 1, 1998.

(30) Foreign Application Priority Data

| Jun. 22, 1998 | (SE) | 9802222 |
| Jun. 22, 1998 | (SE) | 9802223 |
| Jun. 22, 1998 | (SE) | 9802224 |
| Oct. 16, 1998 | (SE) | 9803549 |
| Oct. 16, 1998 | (SE) | 9803550 |
| Oct. 16, 1998 | (SE) | 9803551 |

(51) Int. Cl.[7] ............ C09J 5/04; B32B 31/12; B32B 31/20
(52) U.S. Cl. ............ 156/79; 156/83; 156/291; 156/316
(58) Field of Search ............ 156/FOR 79, FOR 83, 156/3, 3.6, 291

(56) References Cited

U.S. PATENT DOCUMENTS

| 2,015,806 A | * | 10/1935 | Menger | 156/318 |
| 3,615,975 A | * | 10/1971 | Gillern et al. | 156/79 |
| 4,115,178 A | * | 9/1978 | Cone et al. | 156/291 |
| 4,396,563 A | * | 8/1983 | Gusmer | 264/417 |

FOREIGN PATENT DOCUMENTS

| EP | 0131883 | 1/1985 |
| EP | 0362742 | 4/1990 |
| SE | 373525 | 10/1975 |

OTHER PUBLICATIONS

Derwent English language abstract of SU 327224.
Derwent English language abstract of EP 362742.

* cited by examiner

Primary Examiner—Sam Chuan Yao
(74) Attorney, Agent, or Firm—David J. Serbin

(57) ABSTRACT

A method of gluing pieces of substrate together, by using an expandable gluing system comprising a resin component and a hardener component, wherein the hardener component is acidic, and the resin component comprises one or more gas generating substances capable of forming a gas when contacted with the hardener component, whereby the resin and the hardener components are separately applied onto the substrate. The invention also relates to a device suitable for carrying out the method.

15 Claims, No Drawings

METHOD FOR APPLICATION OF AN EXPANDABLE GLUING SYSTEM

This application claims the benefit of Provisional applications No. 60/091,442 filed Jul. 1, 1998, No. 60/091,440 filed Jul. 1, 1998, No. 60/091,438 filed Jul. 1, 1998.

The present invention relates to a method for separate application of the components of an expandable gluing system onto a substrate, the hardener of which system is acidic and forms part of the expandable capability of the system. The invention also relates to a device for carrying out the method.

Expandable gluing systems are known in the art. Such expandable gluing systems can for example be used where pieces to be glued together exhibit irregularities in the surfaces thereof to which glue is to be applied, such as for example in the gluing of wooden pieces together, such as, for instance, for the manufacture of gluelam or laminated timber. The glue will then fill out these irregularities and thereby provide a joint having an improved strength as compared to a gluing system without a gas-forming substance. Another object of such systems is to reduce the amount of wood, which has to be removed by means of, for instance, planing before gluing in order to make the surfaces to be glued smooth. However, in known expandable gluing systems the expandable feature is accomplished by means of, for example, a gas-forming composition or mixture separate from the resin and hardener components, respectively, which is introduced into the gluing system at the time of gluing. Such an expandable gluing system, more particularly a carbamide resin based system, has been disclosed in SU-327224, wherein the mixing of a foaming composition with the resin suitably can be effected at the time of introduction of the carbamide resin curing catalyst.

Hitherto, expandable gluing systems have only been applied to substrates in the form of an admixture of the components included in said system, for example as disclosed in U.S. Pat. No. 3,615,975 A. The expandable systems known in the art, will, for example, be difficult to recirculate, due to, inter alia, the risk of clogging, or build up in the application apparatus of hardened, or partially hardened, mixture of the components of the gluing system. Additionally, the risk of foaming, or undesired gas formation in the application equipment will be present due to the presence of the forming composition. Also start and stop of such application, and operation during long periods of time, will be difficult in practise.

Accordingly, it would be highly desirable to provide a method for application of an expandable gluing system. wherein the components of said system can be recirculated, and wherein the formation of expanding agent, i.e. gas, prior to the pressing of the glued substrates together, is minimised. Also, it would be highly desirable to be able to uniformly regulate the process of expansion, i.e., gas formation, for example, in order to allow relatively long periods of time from application to pressing, and to secure a uniform formation of gas in the applied components. especially during the pressing.

Moreover, it would be highly desirable to find simple application systems for separate application of expandable gluing systems, which can be adjusted to the gluing system in question and the desired assembly times. Also, it would be highly desirable to find an expandable gluing system that requires small amounts of gas generating substances providing improved adhesive joints.

By assembly time it is meant the time that lapse from the moment of application of a gluing system onto a substrate to the moment of pressing the substrates to be glued together.

Thus, according to the present invention, a method for separate application of the components of an expandable gluing system, comprising a resin component and an acidic hardener component and a device suitable for carrying out the method are provided, by which enhanced adhesive and strength properties are obtained and at the same time the above-mentioned problems are overcome.

The method according to the present invention is defined in the appended claims. It comprises gluing of pieces of substrate together, by using an expandable gluing system comprising a resin component and a hardener component, wherein the hardener component is acidic, and the resin component comprises one or more gas generating substances capable of forming a gas when contacted with the hardener component, whereby the resin and the hardener components are separately applied onto the substrate.

The acidic hardener component used in the method of the invention comprises an acid, organic or inorganic such as hydrochloric acid, or an acidic salt such as ammonium chloride. An especially suitable group of acids are the organic acids. Suitable examples of the latter are paratoluene sulfonic acid and carboxylic acids, the latter of which being preferred. Examples of suitable organic carboxylic acids are, formic acid, citric acid, and maleic acid, of which formic acid, and maleic acid are preferred.

The hardener used also has the additional function of providing a component of the reaction system generating the gas, the other component of the gas-producing reaction system being the gas generating substance. Said gas generating substance is provided in admixture with the resin component of the gluing system.

Depending on the reactivity of the components in the gluing system, the desired assembly times, special considerations about substrate damaging by the acid used in the hardener and emission of vapour of the acid into the surrounding atmosphere, such as, in the working environment, the later applied strands may overlap, do not overlap, or do not contact, respectively, the corresponding previously applied strands of the other components.

As used here, the term "strand" also comprehends the meaning of the term "ribbon", also conventionally used in the art, and any other like term.

The device according to the invention is defined in the appended claims and can be used for carrying out the method, wherein the components of the expandable gluing system are applied in the form of strands into a substrate.

The present invention, interalia, offers the advantages of using an expandable gluing system having a reduced number of essential constituents. Additionally, according to the invention, the need of a step comprising the addition of a gas-forming system into the gluing system, or into any of its components, prior to application of the gluing system, can conveniently be eliminated. Moreover, according to the invention only small amounts of the gas generating substance are needed, which gives rise to improved adhesives and strength properties of the glued products.

The technique according to the present invention is especially useful with the amino resin systems, the hardeners of which are generally acidic. Examples of such systems are; urea-formaldehyde, melamine-urea-formaldehyde, melamine-formaldehyde, melamine-urea-phenol-formaldehyde resins, and furfuryl alcohol modified varieties thereof.

The gas producing substance can be any carbonate or hydrogen carbonate that will generate $CO_2$ upon contact with an acid. Suitable examples are, for instance, sodium hydrogen carbonate, calcium carbonate, sodium carbonate, ammonium carbonate, ammonium hydrogen carbonate, magnesium carbonate, or a mixture thereof. Preferably calcium and/or sodium carbonate is used. The gas producing substance can normally be included in the resin component in an amount ranging from 0.1–10% by weight, suitably from 0.1–5%, preferably from 0.15–2% and most preferably from 0.15–1,9%, as calculated on the pure, active form of said substance, i.e. the form that will generate the gas, with any impurities excluded.

Other gas generating substances, which generate a gas having a low boiling point on the contact with an acid used in the hardener, could also be used in the present invention. Examples of such gases are, for instance, ammonia, nitric dioxide, etc., although not preferred from an environmental standpoint, for example.

The gas generating substance can also, for example, be used together with a conventional filler such as kaolin, or mixtures thereof. However, when the filler used comprises, or constitutes. one or more gas generating substances as used herein, the total amount of the pure active form of such substances should be kept within the interval stated above.

In the method of the invention, the two components constituting the gluing system are applied separately. Application of the gluing system can be accomplished, for example, by means of curtain, spray or strand type application, or any combination thereof. Application in the form of separate strands of the respective components is preferred.

After application of the expandable gluing system to the substrates, such as, for example, wooden lamellae, the substrates are brought together and pressed into an aggregate, such as, for example, a wooden beam.

It is preferred that the main production of gas in the expandable gluing system essentially occurs at the time of pressing, following the application of said system to the substrates. Since the gas-forming reaction commences upon contact of the two components, the contact of the components with each other should desirably not be fully established until such pressing. Thus, the method of the invention employs separate application in order to minimise the contact and the degree of mixing of the components prior to pressing, and thereby the extent of the gas-forming process occurring prior to pressing. Preferably, a regulated, continuous, minimal contact of the different strands should be secured, in order to secure an adequate miscibility of the strands during pressing. Thereby, the gas-forming reaction can be more carefully regulated, while also longer periods of time are allowed to lapse between application and pressing, such as, up to 180 minutes, if desired, preferably 0–90 minutes. This object is achieved by using application of the components in the form of strands.

Depending on the reactivity of the components of the gluing system and the desired assembly time, the strands of the different components, such as the hardener and the resin, can be applied in relation to each other in various suitable ways. Thus, for low reactive/slow curing gluing systems, and/or short assembly times, it is suitable that the later applied strands of one component overlap the corresponding strands of the previously applied component(s), or they are applied adjacent to each other so that they are in essentially contact with each other. When high reactive/fast curing gluing systems are used, and/or long assembly times are desired, it is suitable that the later applied strands of one component are applied with a certain distance in relation to the corresponding strands of the previously applied component(s). For assembly times of about 60–120 min a distance of about 4–8 mm between the strands of the different components of the gluing system, such as the hardener and the resin, is suitable, for assembly times of about 15–60 min a distance of about 2–4 mm is preferred, and for assembly times of about up to 15 min overlapping of the strands or essentially contact between them is preferred.

During the pressing, the two components will flow to some extent between the pieces of substrate that are being pressed together, whereby the components also will be mixed with each other to a higher degree than prior to the pressing, and are thereby brought into a more intimate contact with each other. In this manner the principal gas-generation will occur during the pressing. Also, the gas formation during the pressing will contribute to the mixing to some extent.

Accordingly, in one embodiment of the method of the present invention, separate application of the components in the form of strands is used.

A suitable device for such application of the components used in the present method, is a device comprising a unit of at least two hollow members, at least one member for each component, provided with a number of orifices in each member designed to apply the respective component onto a substrate, below said hollow members, to form strands, the hollow members being positioned above the plane of application, wherein each of the orifices of one hollow member are aligned in the machine direction in relation to the corresponding orifices of the other hollow member(s).

This device enables application of the components of a gluing system, such as a resin and a hardener, onto a substrate, wherein the later applied strands of one component are overlapping the previously applied strands of the other component(s).

Another suitable device for such application of the components used in the present method, is a device comprising a unit of at least two hollow members, at least one member for each component, provided with a number of orifices in each member designed to apply the respective component onto a substrate below said hollow members to form strands, the hollow members being positioned above the plane of application, wherein each of the orifices of one hollow member are parallel displaced in the machine direction in relation to the corresponding orifices of the other hollow member(s). This device enables application of the components of a gluing system, such as a resin and a hardener, onto a substrate, wherein the later applied strands of one component are applied at a certain distance, depending on the gluing system used and the wanted assembly time, in relation to the previously applied strands of the other component(s).

A preferred method of separate application in the form of strands is a method wherein the above device is used, whereby the corresponding strands of the components used, are in essentially continuous contact with each other throughout the length of said strands.

In this manner, uniform contact of the resin and hardener strands is secured at the time of application, while the more fully intermixing of the two components, generating the gas, is not established until the time of pressing.

As an example of another suitable embodiment of the method of the invention, a method wherein the resin component preferably is applied first, in the form of strands, which strands optionally can coalesce to form an essentially continuous layer thereof, whereupon the hardener component, in the form of strands, or by means of spraying, is, applied, can be used. This embodiment is, for example, suitable when it is desired to minimise the contact of hardener and substrate.

In the following two examples, roughly planed pieces of spruce were provided with a conventional non-expandable gluing system, and with an expandable system of the invention, respectively, by means of separate strand application of the two components after each other. Thereafter laminates were formed from the pieces with the non-expandable, and the expandable gluing system, respectively, and subsequently tested for delamination.

EXAMPLE 1

Substrate: 90 cm×15,5 cm pieces of spruce
Resin component: SL97044 (a melamine-urea formaldehyde resin, containing calcium carbonate as the gas generating substance)
Content of gas generating substance
in the resin: 1% by weight
Hardener component: formic acid based
Molar ratio of resin/hardener: 100:30
Amount applied: 400 g/m2
Order of application: resin, then hardener After application, the laminates were pressed at a pressure of 7–8 bar during the night. After one day of after-curing the laminates were tested for delamination. The results are shown in the Table below.

EXAMPLE 2 (COMPARATIVE)

Example 1 was repeated with the only difference that the resin component used was SL97043 (a melamine-urea-formaldehyde resin containing no gas generating substance). The resulting laminates were tested in the same way as described above and the results are given in the Table below.

TABLE

| Gluing system = SL 97043/formic acid based hardener | Delamination | Gluing system = SL97044*/formic acid based hardener (expandable) | Delamination |
| --- | --- | --- | --- |
| Laminate = A | 18.3% | 3.9% | |
| B | 3.21% | 0.7% | |
| C | 0% | 0.7% | |
| D | 0.5% | 0 | |
| E | 2.9% | 0 | |
| F | 3.4% | 1.3% | |
| G | 6.3% | 1.3% | |
| H | 5.6% | 0 | |
| I | 7.5% | 0.5% | |
| Average: | 5.9% | 0.9% | |

*SL97044 = SL97043 + gas generating substance

From the table, it can be clearly seen that the delamination results for the laminates formed using the gluing system according to the present invention are substantially improved, as compared to those for the laminates formed with the non-expandable gluing system. The delamination was determined according to EN-391-B.

Thus, these examples clearly demonstrate the improvements obtained with the method of the present invention, wherein an expandable gluing system is used, as compared to the usage of a non-expandable gluing system.

What is claimed is:

1. A method of gluing, comprising the steps of applying a resin component including a gas generating substance to a first substrate, separately applying an acidic hardener component to said first substrate, thereafter pressing a second substrate onto said first substrate and thereby effecting sufficient mixing of said resin and hardener components to form a glue mixture capable of forming a bond, generating a gas via said gas generating substance and thereby expanding said glue mixture, and forming a glue bond between said substrates via said glue mixture, wherein said resin and hardener components are applied to said first substrate in the form of strands, and wherein an excess, if any, of at least one of the resin or hardener is capable of being used in a respective said applying step.

2. A method according to claim 1, wherein the gas generating substance(s) is/are included in the resin component in an amount of 0.1–10% by weight, as calculated on the pure, active form of said substance(s).

3. A method according to claim 2, wherein the gas generating substance(s) is/are included in the resin component in an amount of 0.1–1.9% by weight, as calculated on the pure, active form of said substance(s).

4. A method according to claim 1, wherein the gas generating substance is a carbonate, or hydrogen carbonate which generates $CO_2$ upon contact with an acid.

5. A method according to claim 4, wherein the gas generating substance is calcium carbonate and/or sodium carbonate.

6. A method according to claim 1, wherein the acidic hardener comprises a carboxylic acid.

7. A method according to claim 6, wherein the carboxylic acid is formic acid, or maleic acid.

8. A method according to claim 1, wherein the resin used is an amino resin.

9. A method according to claim 8, wherein the amino resin is selected from the group of melamine-urea-formaldehyde, melamine-formaldehyde, and urea-formaldehyde resins.

10. A method according to claim 1, wherein the later applied strands of one component substantially overlap the corresponding previously applied strands of the other component.

11. A method according to claim 10, wherein the hardener component is applied in the form of strands on top of the resin strands.

12. A method according to claim 1, wherein the later applied strands of one component do not overlap the corresponding previously applied strands of the other component.

13. A method according to claim 1, wherein the later applied strands of one component do not contact the corresponding previously applied strands of the other component.

14. A method according to claim 1, wherein the substrates are made of wood.

15. A method according to claim 1, wherein the main formation of the expanding agent occurs during pressing of the pieces, to which the gluing system components are applied, for gluing them together, in order to prepare a glued aggregate.

* * * * *